United States Patent
Vaghasiya et al.

(10) Patent No.: US 12,032,853 B2
(45) Date of Patent: Jul. 9, 2024

(54) DATA RELOCATION SCHEME SELECTION FOR A MEMORY SYSTEM

(71) Applicant: Micron Technology, Inc., Boise, ID (US)

(72) Inventors: Rakeshkumar Dayabhai Vaghasiya, Hyderabad (IN); Nicola Colella, Capodrise (IT); Mani Raghavendra Aravapalli, Hyderabad (IN); Anil Sindhi, Hyderabad (IN); Dhruv Chauhan, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 131 days.

(21) Appl. No.: 17/584,077

(22) Filed: Jan. 25, 2022

(65) Prior Publication Data
US 2023/0236762 A1  Jul. 27, 2023

(51) Int. Cl.
*G06F 3/06* (2006.01)

(52) U.S. Cl.
CPC .......... *G06F 3/0659* (2013.01); *G06F 3/0619* (2013.01); *G06F 3/064* (2013.01); *G06F 3/0647* (2013.01); *G06F 3/0679* (2013.01)

(58) Field of Classification Search
None
See application file for complete search history.

(56) References Cited

U.S. PATENT DOCUMENTS

2020/0042207 A1*  2/2020  Kwak ................ G06F 3/0634

* cited by examiner

*Primary Examiner* — Michael Alsip
(74) *Attorney, Agent, or Firm* — Holland & Hart LLP (57) ABSTRACT

Methods, systems, and devices for data relocation scheme selection for a memory system are described. A system may select, based on a fragmentation characteristic of data associated with a block of addresses, whether to perform a relocation associated with relocating invalid data, or to perform a relocation associated with refraining from relocating invalid data. A relocation associated with relocating invalid data may be selected for relatively more-fragmented data, which may avoid a relatively higher latency or processing load associated with evaluating validity or updating logical-to-physical mapping at a more-granular level. A relocation associated with refraining from relocating invalid data may be selected for relatively less-fragmented data, which may support increasing available space by relocating data to a physical block with available portions that may be written to, taking advantage of a relatively lower latency or processing load associated with evaluating validity or updating logical-to-physical mapping at a less-granular level.

25 Claims, 5 Drawing Sheets

DATA RELOCATION SCHEME SELECTION FOR A MEMORY SYSTEM

FIELD OF TECHNOLOGY

The following relates to one or more systems for memory, including data relocation scheme selection for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Memory devices of a memory system may store data in accordance with a physical addressing, where physical addresses may identify physical locations of corresponding memory cells within a memory device. A host system coupled with a memory system may reference data (e.g., in support of read commands, write commands, or other commands associated with the data) in accordance with a logical addressing (e.g., logical block addresses (LBAs), virtual addresses, system addresses, or other logical addresses). In some examples, a memory system may generate and maintain one or more levels of mapping (e.g., logical-to-physical mapping, logical-to-logical mapping) between logical addresses associated with the data and physical addresses of the memory cells at which the data is stored, which may support various techniques for changing the physical addresses of data while maintaining logical addresses associated with the data, among other techniques. In some examples, a memory system may also generate and maintain validity information associated with memory addresses (e.g., in a page validity table (PVT)), where addresses indicated as "valid" may be associated with information that is to be maintained and addresses indicated as "invalid" may be associated with information that may be erased (e.g., is no longer to be retained).

A memory system may perform a data relocation operation (e.g., a garbage collection operation, a refresh operation, a dynamic wear leveling operation, reliability relocation operation, a protocol specific folding operation, a flush operation, a post-reflow relocation operation, or some other data relocation operation) to free, consolidate, or otherwise reallocate storage space of the memory system. In some examples, relocation operations on a block of addresses may be associated with relocating data that is indicated as invalid, and performance characteristics of such relocation operations may be based on a fragmentation characteristic of data associated with the block of addresses. In some examples, relocation operations on a block of addresses may be associated with refraining from relocating data that is indicated as invalid. For example, some relocation operations (e.g., that refrain from transferring invalid data) performed on a block of addresses with relatively more-fragmented data (e.g., having a relatively large quantity or proportion of non-sequential or unrelated data portions) may involve longer latency, higher power consumption, or greater processing load than such relocation operations performed on a block of addresses with relatively less-fragmented data (e.g., having a relatively small quantity or proportion of non-sequential or unrelated data portions, relatively sequential data).

In accordance with examples as disclosed herein, a system (e.g., a memory system, a host system coupled with a memory system) may be configured to select a data relocation operation based on a fragmentation characteristic of a block of addresses associated with the relocation operation. For example, a system may select, based on a fragmentation characteristic of data associated with a block of addresses (e.g., a logical block), whether to perform a relocation operation associated with relocating invalid data, or to perform a relocation operation associated with refraining from relocating invalid data (e.g., a relocation operation associated with relocating only valid data). In some examples, a relocation operation associated with relocating invalid data (e.g., a refresh operation, which may be referred to as a blind copy) may be selected for relatively more-fragmented data, which may avoid a relatively higher latency, power consumption, or processing load associated with evaluating validity or updating logical-to-physical mapping (e.g., at a more-granular level associated with relatively more-fragmented data). In some examples, a relocation operation associated with refraining from relocating invalid data (e.g., a garbage collection operation) may be selected for relatively less-fragmented data, which may support increasing available space by relocating data to a physical block with available portions that may be written to, rather than occupying portions with invalid data that may not be overwritten, reducing a total bytes written and write amplification associated with the memory device, and taking advantage of a relatively lower latency, power consumption, or processing load associated with evaluating validity or updating logical-to-physical mapping (e.g., at a less-granular level associated with the relatively less-fragmented data). By evaluating a fragmentation characteristic of data associated with a block of addresses, a system may support a selection of a relocation operation that balances related performance characteristics of the relocation, such as latency, power consumption, and processing load, with other characteristics of the system.

Figure 1:
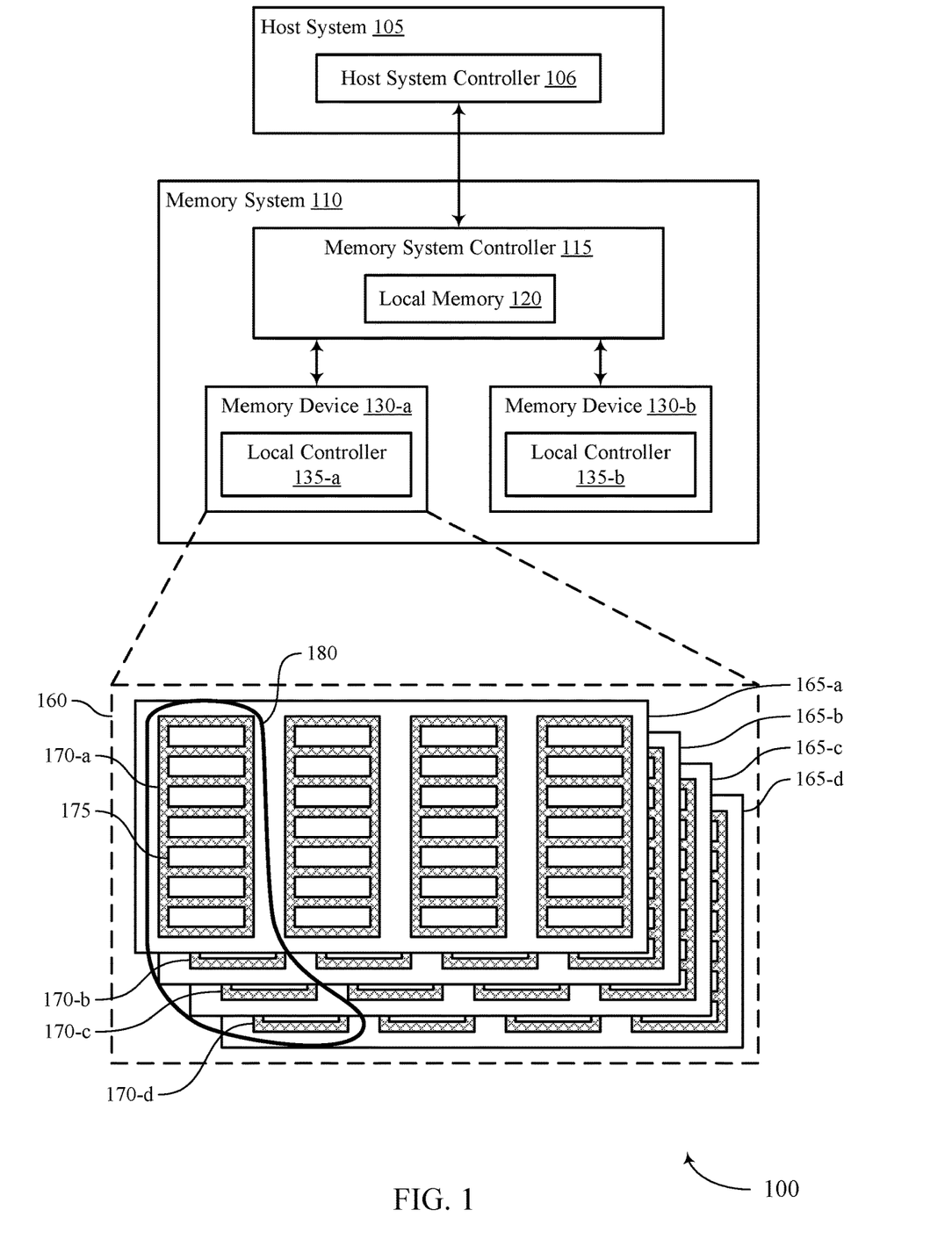
FIG. 1 illustrates an example of a system that supports data relocation scheme selection for a memory system in accordance with examples as disclosed herein.

Features of the disclosure are initially described in the context of systems with reference to FIG. 1. Features of the disclosure are described in the context of a data scheme and a process flow with reference to FIGS. 2 and 3. These and other features of the disclosure are further illustrated by and described in the context of an apparatus diagram and flowchart that relate to data relocation scheme selection for a memory system with reference to FIGS. 4 and 5.

FIG. 1 illustrates an example of a system 100 that supports data relocation scheme selection for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark (e.g., in a PVT) or otherwise designate the data that remains in the old block 170 as invalid (e.g., obsolete) and may update a mapping table (e.g., a logical-to-physical (L2P) mapping table) to associate the logical address (e.g., LBA) for the data with the new, valid block 170 rather than the old, invalid block 170. In some cases, such copying and remapping may be performed instead of rewriting and erasing the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, mapping tables (e.g., L2P mapping tables) may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased. In some examples, validity information may be maintained in a PVT of the memory system 110.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

A memory system 110 may perform a data relocation operation (e.g., a garbage collection operation, a refresh operation, a dynamic wear leveling operation, reliability relocation operation, a protocol specific folding operation, a flush operation, a post-reflow relocation operation, or some other data relocation operation) to reallocate storage space of the memory system 110. In various examples, relocation operations on a block of addresses may be associated with relocating data that is indicated as invalid, and performance characteristics of such relocation operations may be based on a fragmentation characteristic of data associated with the block of addresses. In some examples, relocation operations on a block of addresses may be associated with refraining from relocating data that is indicated as invalid. In accordance with examples as disclosed herein, a system 100 (e.g., a memory system 110, a host system 105 coupled with a memory system 110) may be configured to select a data relocation operation based on a fragmentation characteristic of a block of addresses associated with the relocation operation. For example, a component of the system 100 may select, based on a fragmentation characteristic of data associated with a block of addresses (e.g., a logical block), whether to perform a relocation operation associated with relocating invalid data, or to perform a relocation operation associated with refraining from relocating invalid data (e.g., a relocation operation associated with relocating only valid data).

In some examples, a relocation operation associated with relocating invalid data may include a refresh operation, where all of the data associated with the block of addresses may be copied to new physical addresses (e.g., regardless of whether a given portion of the data has been marked as valid or invalid, which may be referred to as a blind copy). Such relocation operations may, for example, omit operations that evaluate a validity of one or more portions of the block of addresses, or may omit operations that update one or more levels of address mapping (e.g., omitting updates to a logical-to-physical mapping or updates to a logical-to-logical mapping), or both, which may support performing the associated data relocation relatively quickly. In some examples, validity evaluations, updates to address mapping, or both may involve relatively greater processing durations or complexity if data is relatively more-fragmented (e.g., where an associated block of addresses may include a relatively large quantity or proportion of non-sequential or otherwise unrelated data portions). Accordingly, a relocation operation associated with relocating invalid data may be selected for relatively more-fragmented data, which may avoid a relatively higher latency, power consumption, or processing load associated with evaluating validity or updating address mapping (e.g., at a more-granular level associated with relatively more-fragmented data).

In some examples, a relocation operation associated with refraining from relocating invalid data (e.g., relocating only valid data) may include a garbage collection operation, where data that has been marked as valid may be copied to new physical addresses and data that has been marked as invalid is erased. Such relocation operations may, for example, include operations that evaluate a validity of one or more portions of the block of addresses, or may include operations that update one or more levels of address mapping (e.g., performing updates to a logical-to-physical mapping or updates to a logical-to-logical mapping, which may involve transferring one or more address mapping tables between a memory device 130 and local memory 120), or both. Although such operations may incur latency, processing load, or power consumption, a relocation operation that refrains from relocating invalid data may support increasing available space by relocating data to a new physical block with available portions that may be written to, rather than occupying portions of the new physical block with invalid data that may not be overwritten. Additionally, such operations may decrease the total bytes written in the memory system and may reduce a write amplification associated with the memory system. Moreover, although such operations may involve updates to a PVT, a PVT update duration may be negligible compared to updating address mappings, such as physical pointer table (PPT) updates, or a duration associated with transferring data (e.g., because PVT data may be sequential as it relates to a physical-level mapping). Accordingly, a relocation operation associated with refraining from relocating invalid data may be selected for relatively less-fragmented data (e.g., where an associated block of addresses may include a relatively small quantity or proportion of non-sequential or unrelated data portions, relatively sequential data), which may take advantage of a relatively lower latency, power consumption, or processing load associated with evaluating validity or updating logical-to-physical mapping (e.g., at a less-granular level associated with the relatively less-fragmented data).

In some examples (e.g., to balance performance characteristics between a refresh operation on a block of addresses and a garbage collection operation on the block of addresses), the system 100 may perform data relocation evaluations at a more-granular level than for the block of addresses as a whole. For example, for a block of addresses identified for a data relocation operation, the system may evaluate, for each subblock of the block of addresses (e.g., based on a fragmentation characteristic of the subblock), whether to relocate all of the data associated with the subblock (e.g., performing a refresh operation on the subblock) or to refrain from relocating invalid data associated with the subblock (e.g., performing a garbage collection on the subblock). In some examples, such operations may be referred to as a "turbo garbage collection," and may support a mix of characteristics (e.g., a relatively moderate latency or processing load, a relatively moderate increase in available space) between a refresh operation on the block of addresses and a garbage collection operation on the block of addresses.

By evaluating fragmentation characteristics of data associated with a block of addresses, a system 100 may support a selection of a relocation operation that balances related performance characteristics of the relocation with other characteristics of the system. For example, the system 100 may balance latency, power consumption, or processing load with increasing available space and limiting memory cell fatigue that may be associated with relocating invalid data. In some circumstances (e.g., for relatively less-fragmented data), a relocation operation that refrains from relocating invalid data (e.g., a garbage collection operation) may be faster than a relocation operation that relocates invalid data (e.g., a refresh operation, a turbo garbage collection operation), or may be performed within a threshold difference in duration, and it may be preferable to perform the relocation operation that refrains from relocating invalid data since it may generally be better for improving available space and improving endurance performance of a memory device 130 (e.g., reducing fatigue of memory cells of the memory device 130).

The system 100 may include any quantity of non-transitory computer readable media that support data relocation scheme selection for a memory system. For example, the host system controller 106, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, the memory system controller 115, or the memory device 130 to perform one or more associated functions as described herein.

Figure 2:
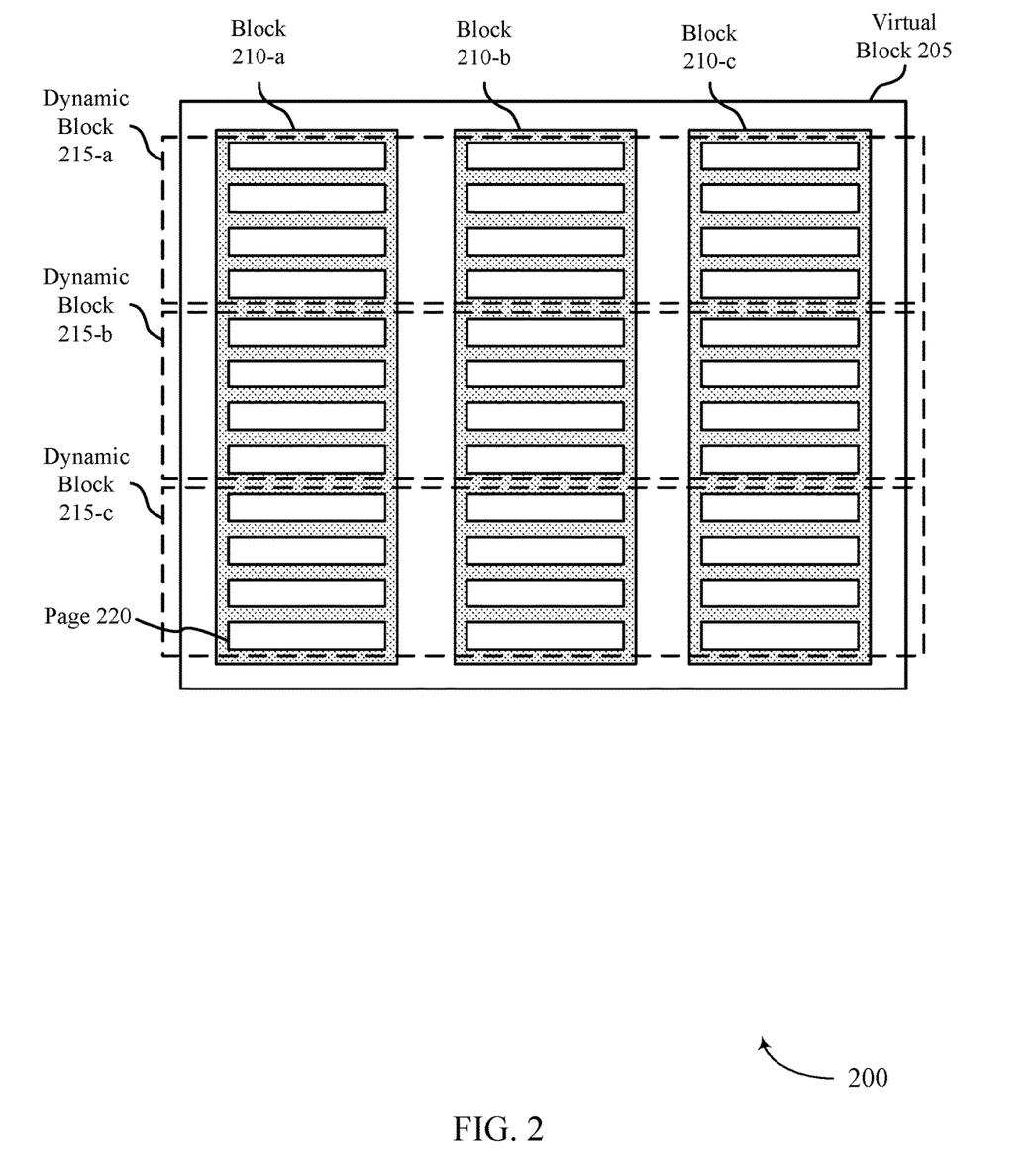
FIG. 2 illustrates an example of a data scheme that supports data relocation scheme selection for a memory system in accordance with examples as disclosed herein.

FIG. 2 illustrates an example of a data scheme 200 that supports data relocation operation techniques in accordance with examples as disclosed herein. The data scheme 200 may be implemented by one or more components of a system 100 (e.g., a controller) as described with reference to FIG. 1. For example, the data scheme 200 may be implemented by one or more memory devices of a memory system 110, such as one or more memory devices 130, and a controller of a memory system or a memory device (or both) such as a memory system controller 115 or a local controller 135, as described with reference to FIG. 1. In some examples, the data scheme 200 may be a logical representation and organization of memory cells that is used by a controller to support data relocation operations as described herein.

The data scheme 200 illustrates an example of a virtual block 205 (e.g., a logical block). The virtual block 205 may be a logical grouping of one or more blocks 210, where each block 210 may be an example of a block 170 as described with reference to FIG. 1. For example, a controller may group a block 210-a, a block 210-b, and a block 210-c, and may refer to the group as a virtual block 205. The controller may assign an index to the virtual block 205, which the controller may use to locate the virtual block 205 and to access memory cells of the virtual block 205. For illustrative purposes, FIG. 2 depicts the virtual block 205 as including three blocks 210, however the principles disclosed herein may be adapted and applied for the virtual block 205 to include any quantity of blocks 210.

Each of the blocks 210-a, 210-b, and 210-c may include a quantity of pages 220, which may be examples of pages 175 as described with reference to FIG. 1. A pageline of the virtual block 205 may refer to a single row of pages 220 of the virtual block 205. For example, a pageline corresponding to the top row of the virtual block 205 may include the top refer to a logical grouping of pagelines of the virtual block 205. For example, a dynamic block 215-*a* may include the first four pagelines of the virtual block 205; a dynamic block 215-*b* may include the next four pagelines of the virtual block 205; and a dynamic block 215-*c* may include the last four pagelines of the virtual block 205. In some examples, a quantity of pagelines included in a respective dynamic block 215 may be pre-configured. In some other examples, a controller may configure a quantity of pagelines included in a respective dynamic block 215. The controller may assign an index to each dynamic block 215, which the controller may use to locate a respective dynamic block 215 and to access memory cells of the respective dynamic block 215.

A controller may generate, maintain, and store a first mapping (e.g., a logical-to-logical mapping) that maps indices of the dynamic blocks 215 to corresponding virtual blocks 205. For example, an entry of the first mapping that maps the dynamic block 215-*a* to the virtual block 205 may include a first index associated with the dynamic block 215-*a*, a second index associated with the virtual block 205, and an offset of the dynamic block 215-*a* within the virtual block 205. Accordingly, by reading the entry of the first mapping, the controller may determine the virtual block 205 in which the dynamic block 215-*a* is located as well as the position of the dynamic block 215-*a* within the virtual block 205. In some examples, the first mapping may be referred to as a dynamic block array table.

A controller may generate, maintain, and store a second mapping (e.g., a logical-to-physical mapping) that indicates relationships between logical addresses and corresponding physical addresses. For example, an entry of the second mapping may map a logical address of a page 220 to a corresponding physical address of the page 220. Accordingly, by reading the entry of the second mapping, the controller may determine the physical address of a page 220. In some examples, the second mapping may be an example a PPT that maps logical addresses (e.g., LBAs) to corresponding physical addresses of a non-volatile memory device (e.g., a memory device 130, a NAND device, or some other non-volatile memory device) coupled with the controller. In some cases, the second mapping may be an example an L2P mapping table. In some examples, to update the second mapping (e.g., if data contained in a page 220 is written to a different page 220), the controller may load at least a portion of the second mapping that includes an entry to be updated into a volatile memory device of the memory system (e.g., a local memory 120, a memory device 130 including volatile memory cells), update the entry, and unload the portion of the second mapping to a non-volatile memory device of the memory system (e.g., a memory device 130 including non-volatile memory cells).

In some examples, a controller may determine to perform a data relocation operation associated with a virtual block 205. In accordance with examples as disclosed herein, such a controller may select between one or more data relocation operations associated with relocating invalid data and one or more data relocation operations associated with refraining from relocating invalid data based on a fragmentation characteristic of the virtual block 205 (e.g., of data included in the virtual block 205).

In an example of a first relocation operation, associated with relocating invalid data of the virtual block 205 (e.g., relocating all of the data of the virtual block 205), the controller may read data stored at the associated dynamic blocks 215 of the virtual block 205 and write the data to different dynamic blocks 215. For example, with reference to the dynamic block 215-*a*, the controller may read the data stored in each of the pages 220 included in the dynamic block 215-*a* and may write the data to pages 220 of a second dynamic block 215. In some examples, the dynamic block 215-*a* may include one or more pages 220 that contain valid data and one or more pages 220 that contain invalid data. Here, the controller may read both the pages 220 containing valid data and the pages 220 containing invalid data and may write both the valid data and the invalid data to the second dynamic block 215. In some examples, the controller may write the data read from the dynamic block 215-*a* to the second dynamic block 215 in a same order that the data was written to the dynamic block 215-*a*. In other words, performing the data relocation operation using the first data relocation procedure may include copying the dynamic block 215-*a* to the second dynamic block 215.

Additionally, to perform the data relocation operation using the first data procedure, the controller may update the first mapping to indicate an updated location of the associated dynamic block 215 and may refrain from updating the second mapping. For example, the controller may update an entry of the first mapping associated with the dynamic block 215-*a*. To update the entry of the first mapping, the controller may update the second index of the entry to indicate a virtual block 205 associated with the second dynamic block 215 and may update the offset to indicate a location of the dynamic block 215-*a* within the virtual block 205. Because the second dynamic block 215 is a copy of the dynamic block 215-*a* (e.g., the dynamic block 215-*a* changes locations), the controller may refrain from updating the second mapping. Instead, the controller may subsequently use the updated first mapping (e.g., in conjunction with the non-updated second mapping) to determine the physical address of a page 220 of the second dynamic block 215.

Alternatively, to perform the data relocation operation using a second data relocation procedure, associated with refraining from relocating invalid data of the virtual block 205, the controller may determine pages 220 of each dynamic block 215 associated with the data relocation procedure that contain valid data and may write the pages containing valid data to one or more different dynamic blocks 215. For example, with reference to the dynamic block 215-*a*, the controller may determine which pages 220 included in the dynamic block 215-*a* contain valid data and may write pages 220 containing valid data to a second dynamic block 215. Additionally, the controller may update the second mapping to map the logical addresses of the pages 220 written to the second dynamic block 215 to corresponding physical addresses of the second dynamic block 215.

In some examples, the controller may select a procedure to perform the data relocation operation for each dynamic block 215 of the virtual block 205, which may be based on a fragmentation characteristic of a respective dynamic block 215. For example, the controller may select the first data relocation procedure to perform the data relocation operation on the dynamic block 215-*a* and the dynamic block 215-*c* (e.g., if the dynamic blocks 215-*a* and 215-*c* are associated with relatively more-fragmented data) and the second data relocation procedure to perform the data relocation operation on the dynamic block 215-*b* (e.g., if the dynamic block 215-*b* is associated with relatively less-fragmented data). In this way, the controller may implement a data relocation approach that selects procedures to perform data relocation operations on a per dynamic block basis.

Figure 3:
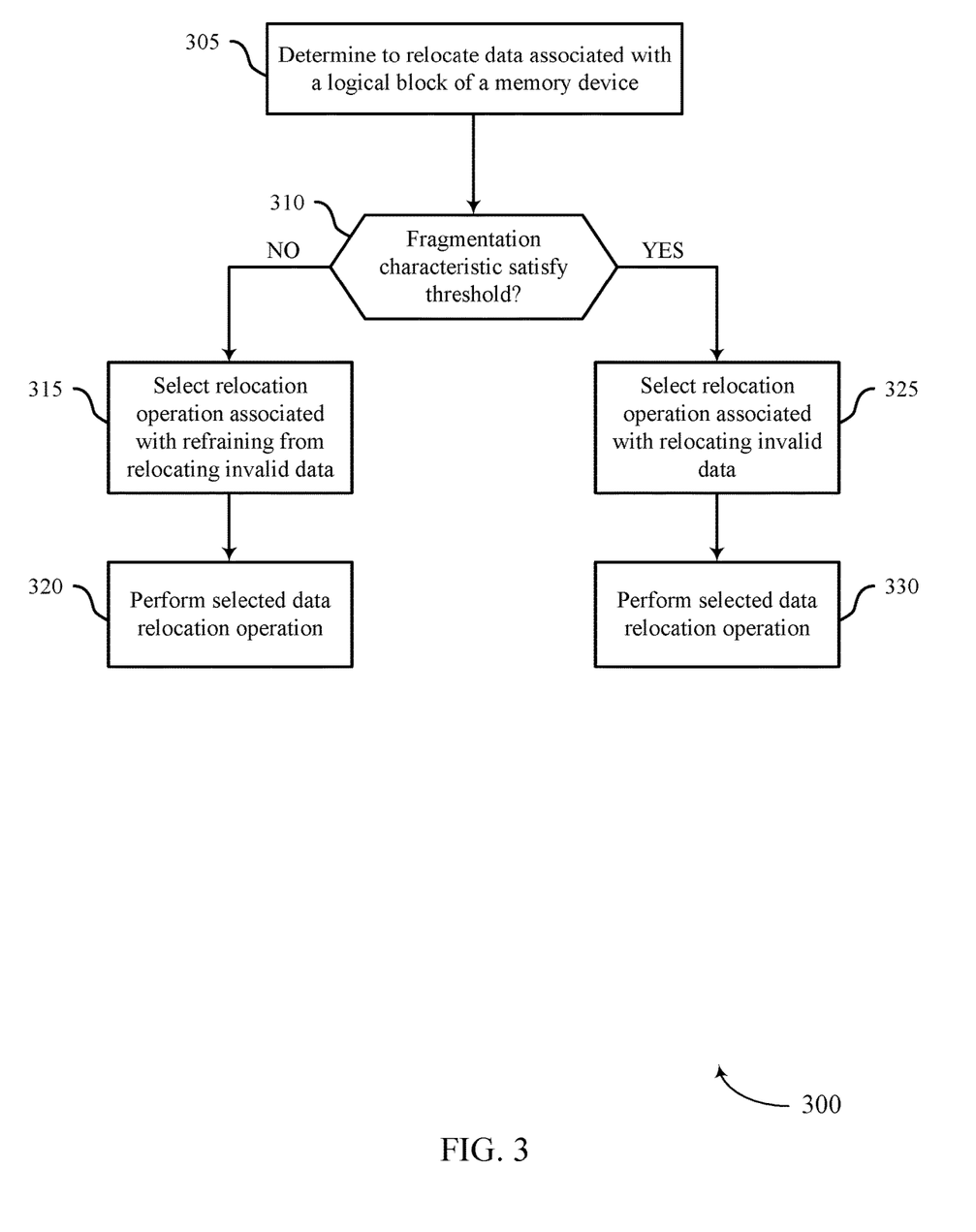
FIG. 3 illustrates an example of a process flow that supports data relocation scheme selection for a memory system in accordance with examples as disclosed herein.

FIG. 3 illustrates an example of a process flow 300 that supports data relocation scheme selection for a memory system in accordance with examples as disclosed herein. The process flow 300 may be performed by components of a system, such as system 100 described with reference to FIG. 1. For example, one or more aspects of the process flow 300 may be performed by a controller of a host system 105, such as a host system controller 106, or by a controller of a memory system 110 or a memory device 130 (or both), such as a memory system controller 115 or a local controller 135 as described with reference to FIG. 1. The process flow 300 may illustrate an example for selecting a procedure for performing a data relocation operation based on a fragmentation characteristic, which may be implemented to balance latency, power consumption, and processor load (e.g., associated with data relocation) with storage availability and endurance characteristics, among other considerations. Aspects of the process flow 300 may be implemented by a controller, among other components. Additionally or alternatively, aspects of the process flow 300 may be implemented as instructions stored in memory (e.g., firmware stored in a memory coupled with the host system controller 106, the memory system controller 115, or the local controller 135). For example, the instructions, if executed by a controller (e.g., a host system controller 106, a memory system controller 115, a local controller 135), may cause the controller to perform the operations of the process flow 300.

In the following description of the process flow 300, the operations may be performed in different orders or at different times. Some operations may also be omitted from the process flow 300, and other operations may be added to the process flow 300.

At 305, the process flow 300 may include determining to relocate data associated with a logical block of a memory system (e.g., a virtual block 205). In some examples, the determination of 305 may be associated with an error control functionality (e.g., of the host system 105, of the memory system 110). For example, the determination of 305 may be based on identifying one or more read errors, such as a quantity of read errors associated with the logical block. In some examples, the determination to relocate the data associated with the logical block may be based on a presence of a read error, or based on a quantity of read errors satisfying a threshold. In various examples, the quantity of read errors may include a quantity of correctible errors, or a quantity of uncorrectable errors, or a combination thereof. Although, in some examples, such error control conditions may be associated with (e.g., default to) performing a refresh operation (e.g., to rapidly move data to another virtual block 205 in response to an error condition), aspects of the process flow 300 may illustrate examples where a garbage collection operation or a turbo garbage collection operation may be performed in place of a refresh operation, in response to an evaluation of fragmentation (e.g., randomization) of data in the logical block. In some examples, the determination of 305 may be associated with evaluating addresses for erasure, such as identifying a threshold quantity or proportion of invalid data associated with the logical block. In some examples, the determination of 305 may be performed by a memory system 110 in response to receiving (e.g., from a host system 105) a command to perform a relocation operation.

At 310, an evaluation may be performed to determine whether a fragmentation characteristic of the data associated with the logical block satisfies a threshold. In some examples, not satisfying the threshold may be associated with the logical block including relatively less-fragmented data (e.g., having a relatively small quantity or proportion of non-sequential or unrelated data portions, having relatively sequential data), and satisfying the threshold may be associated with the logical block including relatively more-fragmented data (e.g., having a relatively large quantity or proportion of non-sequential or unrelated data portions, having relatively random data). If the fragmentation characteristic does not satisfy the threshold, the process flow 300 may proceed to 315 and, if the fragmentation characteristic satisfies the threshold, the process flow may proceed to 325.

In some examples, a fragmentation characteristic of the data may be associated with (e.g., determined or inferred based at least in part on) a quantity of updates to an address mapping of the memory system 110. For example, a memory device 130 may implement a change log (e.g., an update log) for a mapping table, such as a change log for an L2P table (e.g., a PPT). In some examples, such a change log, or an associated update counter, may support identifying a quantity of updates made to the mapping table (e.g., associated with data being written by a host system 105 or by a memory system 110, such as during garbage collection operations), such as a quantity of PPT updates performed on the logical block identified for the data relocation. For example, such a counter may be incremented each time a PPT is loaded from a memory device 130 to a local memory 120, or each time a PPT is returned (e.g., flushed) from a local memory 120 to a memory device 130. In some examples, a relatively small quantity of updates may imply relatively less-fragmented (e.g., more continuous, more sequential, less random) data for the logical block, and a relatively large quantity of updates may imply relatively more-fragmented data (e.g., less continuous, less sequential, more random). In some examples, a fragmentation characteristic may also be associated with (e.g., determined or inferred based at least in part on) a quantity of invalid pages in the logical block. For example, for the determination of 310, if a quantity of PPT updates for the logical block identified for data relocation is less than a quantity of invalid pages in the logical block (e.g., not satisfying the threshold of 310, indicating relatively less-fragmented data), the process flow may proceed to 315, otherwise the process flow may proceed to 325.

At 315, the process flow 300 may include selecting a relocation operation associated with refraining from relocating invalid data (e.g., relocating only valid data). For example, if a quantity of PPT updates to the logical block is less than a quantity of invalid pages of the logical block, the memory system 110 may have better performance (e.g., improved write amplification) and gain more free space by refraining from relocating invalid data. In some examples, a determined or evaluated degree of fragmentation may be low enough that such operations also may be performed in a shorter duration than if a relocation operation associated with relocating invalid data was performed. In some examples, at 315, the process flow 300 may include selecting a garbage collection operation for the relocation operation.

At 320, the process flow 300 may include performing the relocation operation associated with refraining from relocating invalid data as selected at 315. In some examples, as part of performing the selected relocation operation, one or more counters associated with a change log may be reset (e.g., while a new virtual block opens) and, in some examples, such counters may be incremented for subsequent updates (e.g., on PPT flush, for each write or update an associated address block).

At 325, the process flow 300 may include selecting a relocation operation associated with relocating invalid data (e.g., relocating all data, relocating valid data and at least some invalid data, where applicable). For example, if a quantity of PPT updates to the logical block is greater than, or greater than or equal to, a quantity of invalid pages of the logical block, the memory system 110 may have better performance (e.g., reduced latency) by relocating at least some of the invalid data of the logical block. For example, the memory system may avoid one or more evaluations of data validity, or may avoid updating one or more address mappings (e.g., avoid updating a logical-to-physical mapping, avoid updating a logical-to-logical mapping), or both.

In some examples, the selection of 325 may include a selection of a blind copy operation, where the memory system 110 copies all of the information associated with the logical block to new physical blocks of the memory system 110. In some examples, the selection of 325 (e.g., or the evaluation of 310, or both) may be associated with a more-granular selection of relocation (e.g., by subblock), based on a fragmentation or randomization of data at a more granular level. For example, the selection of 325 may include a selection of whether to perform a relocation operation associated with relocating all of the data associated with the logical block (e.g., in accordance with a refresh operation on the logical block), or to perform a relocation operation associated with evaluating, for each subblock of the logical block, whether to relocate all of the data associated with the subblock or to refrain from relocating invalid data associated with the subblock (e.g., in accordance with a turbo garbage collection operation on the logical block). In other words, in some examples, the selection of 325 may include an evaluation of relocation operation suitability based on a fragmentation or randomization within subblocks of the block of addresses (e.g., within dynamic blocks 215).

An evaluation between performing a refresh operation or a garbage collection operation on subblocks (e.g., dynamic blocks 215) of a logical block (e.g., a virtual block 205) identified for a relocation operation may be supported by evaluations of data fragmentation on a subblock level. For example, if a quantity of PPT updates for a subblock is less than a quantity of invalid pages for the subblock, the selection at 325 may include selecting a garbage collection operation for the subblock, otherwise the selection of 325 may include further evaluation of the suitability for turbo garbage collection. For example, evaluating whether to perform a turbo garbage collection operation may be based on a logical saturation characteristic, or a percentage of valid data in a given subblock (e.g., a given dynamic block 215) compared to valid data in remaining space of the block of addresses (e.g., remaining dynamic blocks 215 of a virtual block 205). For example, if data of the subblock is mostly or completely valid, or if a percentage of valid data compared to a remaining available space for the subblock is relatively high, the selection of 325 may include performing a refresh on the subblock, otherwise a garbage collection operation may be performed on the subblock At 330, the process flow 300 may include performing the relocation operation associated with relocating invalid data as selected at 325. In some examples, as part of performing the selected relocation operation, one or more counters associated with a change log may be reset (e.g., while a new virtual block opens) and, in some examples, such counters may be incremented for subsequent updates (e.g., on PPT flush, for each write or update an associated address block).

Figure 4:
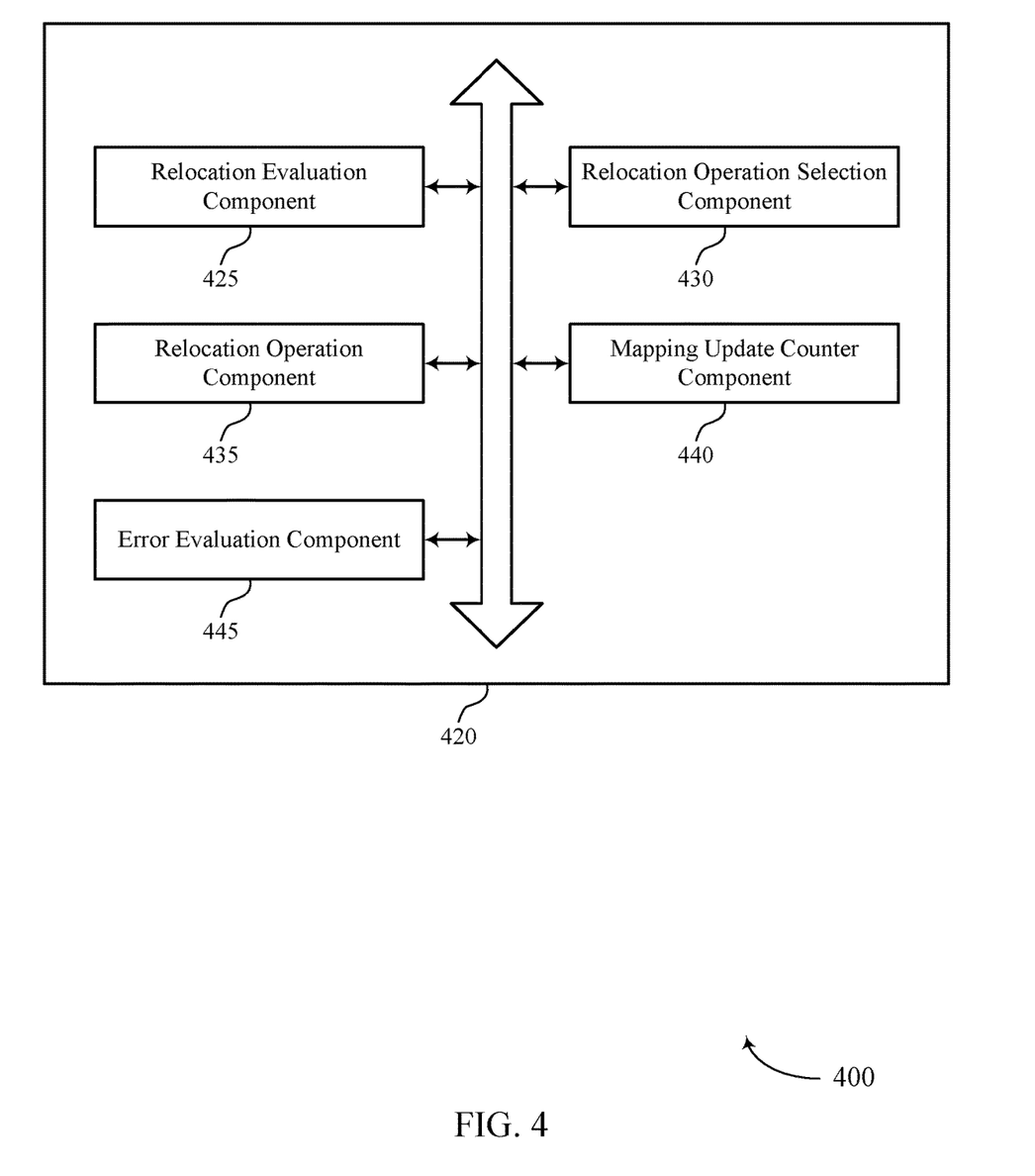
FIG. 4 shows a block diagram of a memory system that supports data relocation scheme selection for a memory system in accordance with examples as disclosed herein.

FIG. 4 shows a block diagram 400 of a system 420 that supports data relocation scheme selection for a memory system in accordance with examples as disclosed herein. The system 420 may be an example of aspects of a memory system, or a host system, as described with reference to FIGS. 1 through 3. The system 420, or various components thereof, may be an example of means for performing various aspects of data relocation scheme selection for a memory system as described herein. For example, the system 420 may include a relocation evaluation component 425, a relocation operation selection component 430, a relocation operation component 435, a mapping update counter component 440, an error evaluation component 445, or any combination thereof. Each of these components may communicate, directly or indirectly, with one another (e.g., via one or more buses).

The relocation evaluation component 425 may be configured as or otherwise support a means for determining to relocate data associated with a logical block of a memory system. The relocation operation selection component 430 may be configured as or otherwise support a means for selecting, based at least in part on a fragmentation characteristic of the data associated with the logical block, whether to perform a relocation operation associated with relocating invalid data or perform a relocation operation associated with refraining from relocating invalid data. The relocation operation component 435 may be configured as or otherwise support a means for performing the selected relocation operation on the logical block based at least in part on determining to relocate the data associated with the logical block.

In some examples, performing the relocation operation associated with relocating invalid data may be associated with refraining from updating a logical-to-physical mapping associated with the logical block.

In some examples, to support the selecting, the relocation operation selection component 430 may be configured as or otherwise support a means for selecting whether to perform a first relocation operation associated with relocating invalid data, the first relocation operation associated with relocating all of the data associated with the logical block, or to perform a second relocation operation associated with relocating invalid data, the second relocation operation associated with evaluating, for each subblock of the logical block, whether to relocate all of the data associated with the subblock or to refrain from relocating invalid data associated with the subblock.

In some examples, the evaluating, for each subblock of the logical block, may be based at least in part on a respective fragmentation characteristic associated with a respective subblock.

In some examples, the evaluating, for each subblock of the logical block, may be based at least in part on proportion of the data associated with the subblock that is valid data and an available capacity associated with the subblock.

In some examples, the fragmentation characteristic of the data associated with the logical block may be associated with a size or a quantity of non-sequential data portions associated with the logical block.

In some examples, the mapping update counter component 440 may be configured as or otherwise support a means for determining the fragmentation characteristic of the data associated with the logical block based at least in part on a quantity of updates to a logical-to-physical mapping associated with the logical block and a quantity of invalid pages associated with the logical block.

In some examples, the relocation operation component 435 may be configured as or otherwise support a means for performing the relocation operation associated with refraining from relocating invalid data. In some examples, the mapping update counter component 440 may be configured as or otherwise support a means for resetting a counter associated with the quantity of updates to the logical-to-physical mapping based at least in part on performing the relocation operation associated with refraining from relocating invalid data.

In some examples, the error evaluation component 445 may be configured as or otherwise support a means for identifying an error associated with the logical block, and determining to relocate the data associated with the logical block may be based at least in part on identifying the error.

Figure 5:
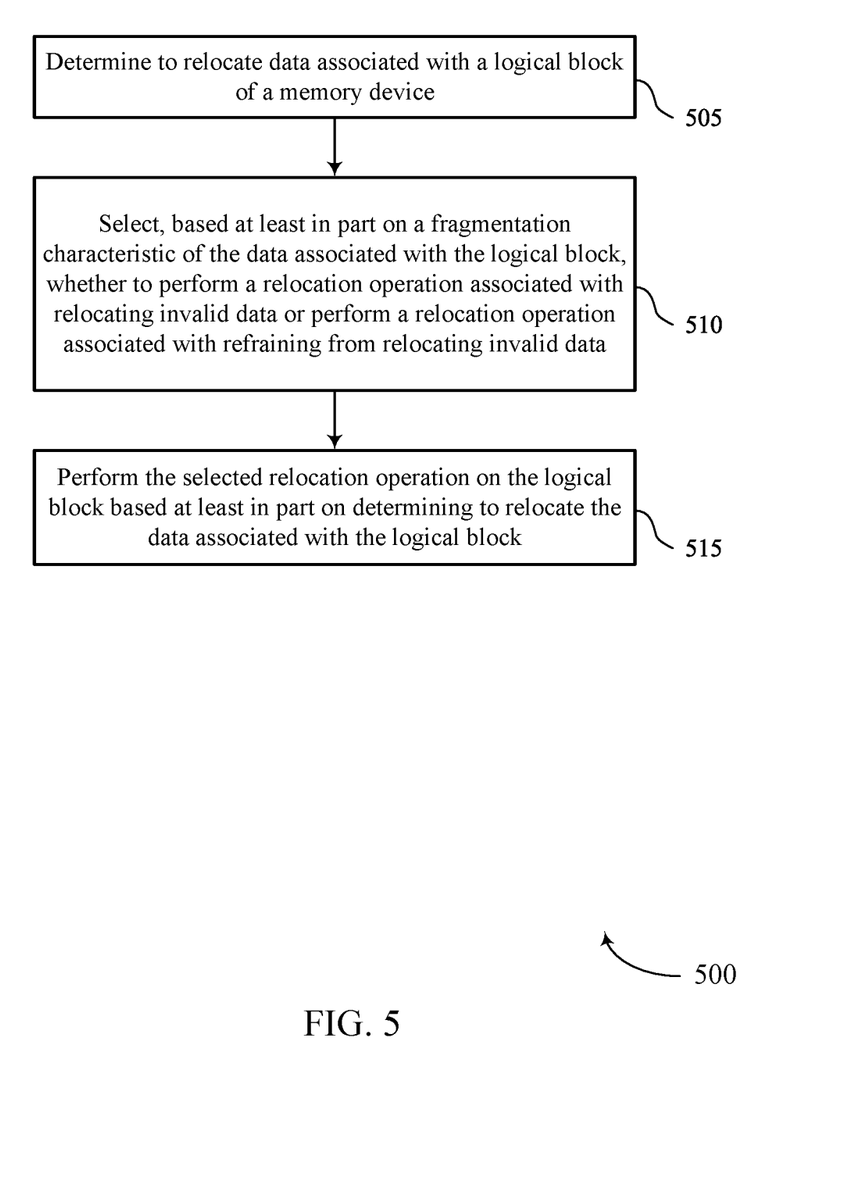
FIG. 5 shows a flowchart illustrating a method or methods that support data relocation scheme selection for a memory system in accordance with examples as disclosed herein.

FIG. 5 shows a flowchart illustrating a method 500 or methods that support data relocation scheme selection for a memory system in accordance with examples as disclosed herein. The operations of method 500 may be implemented by a host system or a memory system, or their respective components as described herein. For example, the operations of method 500 may be performed by a memory system or a host system as described with reference to FIGS. 1 through 4. In some examples, a system may execute a set of instructions to control the functional elements of the device to perform the described functions. Additionally or alternatively, the system may perform aspects of the described functions using special-purpose hardware.

At 505, the method may include determining to relocate data associated with a logical block of a memory system. The operations of 505 may be performed in accordance with examples as disclosed herein. In some examples, aspects of the operations of 505 may be performed by a relocation evaluation component 425 as described with reference to FIG. 4.

At 510, the method may include selecting, based at least in part on a fragmentation characteristic of the data associated with the logical block, whether to perform a relocation operation associated with relocating invalid data or perform a relocation operation associated with refraining from relocating invalid data. The operations of 510 may be performed in accordance with examples as disclosed herein. In some examples, aspects of the operations of 510 may be performed by a relocation operation selection component 430 as described with reference to FIG. 4.

At 515, the method may include performing the selected relocation operation on the logical block based at least in part on determining to relocate the data associated with the logical block. The operations of 515 may be performed in accordance with examples as disclosed herein. In some examples, aspects of the operations of 515 may be performed by a relocation operation component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining to relocate data associated with a logical block of a memory system; selecting, based at least in part on a fragmentation characteristic of the data associated with the logical block, whether to perform a relocation operation associated with relocating invalid data or perform a relocation operation associated with refraining from relocating invalid data; and performing the selected relocation operation on the logical block based at least in part on determining to relocate the data associated with the logical block.

Aspect 2: The method, apparatus, or non-transitory computer-readable medium of aspect 1 where performing the relocation operation associated with relocating invalid data is associated with refraining from updating a logical-to-physical mapping associated with the logical block.

Aspect 3: The method, apparatus, or non-transitory computer-readable medium of any of aspects 1 through 2 where the selecting includes operations, features, circuitry, logic, means, or instructions, or any combination thereof for selecting whether to perform a first relocation operation associated with relocating invalid data, the first relocation operation associated with relocating all of the data associated with the logical block, or to perform a second relocation operation associated with relocating invalid data, the second relocation operation associated with evaluating, for each subblock of the logical block, whether to relocate all of the data associated with the subblock or to refrain from relocating invalid data associated with the subblock.

Aspect 4: The method, apparatus, or non-transitory computer-readable medium of aspect 3 where the evaluating, for each subblock of the logical block, is based at least in part on a respective fragmentation characteristic associated with a respective subblock.

Aspect 5: The method, apparatus, or non-transitory computer-readable medium of any of aspects 3 through 4 where the evaluating, for each subblock of the logical block, is based at least in part on proportion of the data associated with the subblock that is valid data and an available capacity associated with the subblock.

Aspect 6: The method, apparatus, or non-transitory computer-readable medium of any of aspects 1 through 5 where the fragmentation characteristic of the data associated with the logical block is associated with a size or a quantity of non-sequential data portions associated with the logical block.

Aspect 7: The method, apparatus, or non-transitory computer-readable medium of any of aspects 1 through 6, further including operations, features, circuitry, logic, means, or instructions, or any combination thereof for determining the fragmentation characteristic of the data associated with the logical block based at least in part on a quantity of updates to a logical-to-physical mapping associated with the logical block and a quantity of invalid pages associated with the logical block.

Aspect 8: The method, apparatus, or non-transitory computer-readable medium of aspect 7, further including operations, features, circuitry, logic, means, or instructions, or any combination thereof for performing the relocation operation associated with refraining from relocating invalid data and resetting a counter associated with the quantity of updates to the logical-to-physical mapping based at least in part on performing the relocation operation associated with refraining from relocating invalid data.

Aspect 9: The method, apparatus, or non-transitory computer-readable medium of any of aspects 1 through 8, further including operations, features, circuitry, logic, means, or instructions, or any combination thereof for identifying an error associated with the logical block, where determining to relocate the data associated with the logical block is based at least in part on identifying the error.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An A memory system, comprising:
one or more memory devices; and
processing circuitry coupled with the one or more memory devices and configured to cause the memory system to:
determine to relocate data associated with a logical block associated with the one or more memory devices;
select, after determining to relocate the data associated with the logical block and based at least in part on a fragmentation characteristic of the data associated with the logical block, whether to perform either a relocation operation associated with relocating invalid data of the logical block or a relocation operation associated with refraining from relocating invalid data of the logical block; and
perform the selected relocation operation on the logical block based at least in part on determining to relocate the data associated with the logical block.

2. The memory system of claim 1, wherein performing the relocation operation associated with relocating invalid data is associated with refraining from updating a logical-to-physical mapping associated with the logical block.

3. The memory system of claim 1, wherein, for the selecting, the processing circuitry is configured to cause the memory system to:
select whether to perform a first relocation operation associated with relocating invalid data, the first relocation operation associated with relocating all of the data associated with the logical block, or to perform a second relocation operation associated with relocating invalid data, the second relocation operation associated with evaluating, for each subblock of the logical block, whether to relocate all of the data associated with the subblock or to refrain from relocating invalid data associated with the subblock.

4. The memory system of claim 3, wherein the evaluating, for each subblock of the logical block, is based at least in part on a respective fragmentation characteristic associated with a respective subblock.

5. The memory system of claim 3, wherein the evaluating, for each subblock of the logical block, is based at least in part on a proportion of the data associated with the subblock that is valid data and an available capacity associated with the subblock.

6. The memory system of claim 1, wherein the fragmentation characteristic of the data associated with the logical block is associated with a size or a quantity of non-sequential data portions associated with the logical block.

7. The memory system of claim 1, wherein the processing circuitry is further configured to cause the memory system to:
determine the fragmentation characteristic of the data associated with the logical block based at least in part on a quantity of updates to a logical-to-physical mapping associated with the logical block and a quantity of invalid pages associated with the logical block.

8. The memory system of claim 7, wherein the processing circuitry is further configured to cause the memory system to:
perform the relocation operation associated with refraining from relocating invalid data; and
reset a counter associated with the quantity of updates to the logical-to-physical mapping based at least in part on performing the relocation operation associated with refraining from relocating invalid data.

9. The memory system of claim 1, wherein the processing circuitry is further configured to cause the memory system to:
identify an error associated with the logical block, wherein determining to relocate the data associated with the logical block is based at least in part on identifying the error.

10. A non-transitory computer-readable medium storing code comprising instructions which, when executed by processing circuitry of an electronic device, cause the electronic device to:
determine to relocate data associated with a logical block of a memory system;
select, after determining to relocate the data associated with the logical block and based at least in part on a fragmentation characteristic of the data associated with the logical block, whether to perform either a relocation operation associated with relocating invalid data of the logical block or a relocation operation associated with refraining from relocating invalid data of the logical block; and
perform the selected relocation operation on the logical block based at least in part on determining to relocate the data associated with the logical block.

11. The non-transitory computer-readable medium of claim 10, wherein the instructions to perform the relocation operation associated with relocating invalid data, when executed by the processing circuitry of the electronic device, cause the electronic device to refrain from updating a logical-to-physical mapping associated with the logical block.

12. The non-transitory computer-readable medium of claim 10, wherein the instructions for the selecting, when executed by the processing circuitry of the electronic device, cause the electronic device to:
select whether to perform a first relocation operation associated with relocating invalid data, the first relocation operation associated with relocating all of the data associated with the logical block, or to perform a second relocation operation associated with relocating invalid data, the second relocation operation associated with evaluating, for each subblock of the logical block, whether to relocate all of the data associated with the subblock or to refrain from relocating invalid data associated with the subblock.

13. The non-transitory computer-readable medium of claim 12, wherein the instructions for the evaluating, for each subblock of the logical block, are based at least in part on a respective fragmentation characteristic associated with a respective subblock.

14. The non-transitory computer-readable medium of claim 12, wherein the instructions for the evaluating, for each subblock of the logical block, are based at least in part on a proportion of the data associated with the subblock that is valid data and an available capacity associated with the subblock.

15. The non-transitory computer-readable medium of claim 10, wherein the fragmentation characteristic of the data associated with the logical block is associated with a size or a quantity of non-sequential data portions associated with the logical block.

16. The non-transitory computer-readable medium of claim 10, wherein the instructions are further executable by the processing circuitry to:
determine the fragmentation characteristic of the data associated with the logical block based at least in part on a quantity of updates to a logical-to-physical mapping associated with the logical block and a quantity of invalid pages associated with the logical block.

17. The non-transitory computer-readable medium of claim 16, wherein the instructions, when executed by the processing circuitry of the electronic device, further cause the electronic device to:
perform the relocation operation associated with refraining from relocating invalid data; and
reset a counter associated with the quantity of updates to the logical-to-physical mapping based at least in part on performing the relocation operation associated with refraining from relocating invalid data.

18. The non-transitory computer-readable medium of claim 10, wherein the instructions, when executed by the processing circuitry of the electronic device, further cause the electronic device to:
identify an error associated with the logical block, wherein determining to relocate the data associated with the logical block is based at least in part on identifying the error.

19. A method, comprising:
determining to relocate data associated with a logical block of a memory system;
selecting, after determining to relocate the data associated with the logical block and based at least in part on a fragmentation characteristic of the data associated with the logical block, whether to perform either a relocation operation associated with relocating invalid data of the logical block or a relocation operation associated with refraining from relocating invalid data of the logical block; and
performing the selected relocation operation on the logical block based at least in part on determining to relocate the data associated with the logical block.

20. The method of claim 19, wherein performing the relocation operation associated with relocating invalid data is associated with refraining from updating a logical-to-physical mapping associated with the logical block.

21. The method of claim 19, wherein the selecting comprises:

selecting whether to perform a first relocation operation associated with relocating invalid data, the first relocation operation associated with relocating all of the data associated with the logical block, or to perform a second relocation operation associated with relocating invalid data, the second relocation operation associated with evaluating, for each subblock of the logical block, whether to relocate all of the data associated with the subblock or to refrain from relocating invalid data associated with the subblock.

22. The method of claim 19, wherein the fragmentation characteristic of the data associated with the logical block is associated with a size or a quantity of non-sequential data portions associated with the logical block.

23. The method of claim 19, further comprising:
determining the fragmentation characteristic of the data associated with the logical block based at least in part on a quantity of updates to a logical-to-physical mapping associated with the logical block and a quantity of invalid pages associated with the logical block.

24. The method of claim 23, further comprising:
performing the relocation operation associated with refraining from relocating invalid data; and
resetting a counter associated with the quantity of updates to the logical-to-physical mapping based at least in part on performing the relocation operation associated with refraining from relocating invalid data.

25. The method of claim 19, further comprising:
identifying an error associated with the logical block, wherein determining to relocate the data associated with the logical block is based at least in part on identifying the error.

* * * * *